(12) United States Patent
Richardson et al.

(10) Patent No.: US 9,154,797 B2
(45) Date of Patent: Oct. 6, 2015

(54) SYSTEMS AND METHODS FOR ENCODING AND DECODING

(75) Inventors: Iain E. Richardson, Aberdeen (GB); Maja Bystrom, Belmont, MA (US)

(73) Assignee: OneCodec, Limited, Aberdeen, Scotland (GB)

( * ) Notice: Subject to any disclaimer, the term of this patent is extended or adjusted under 35 U.S.C. 154(b) by 611 days.

(21) Appl. No.: 13/212,147

(22) Filed: Aug. 17, 2011

(65) Prior Publication Data

US 2012/0072225 A1 Mar. 22, 2012

Related U.S. Application Data

(60) Provisional application No. 61/384,686, filed on Sep. 20, 2010, provisional application No. 61/387,327, filed on Sep. 28, 2010, provisional application No. 61/443,658, filed on Feb. 16, 2011, provisional application No. 61/443,660, filed on Feb. 16, 2011.

(51) Int. Cl.
| | |
|---|---|
| *H04N 19/162* | (2014.01) |
| *H04N 19/44* | (2014.01) |
| *H04N 19/12* | (2014.01) |
| *H04N 19/70* | (2014.01) |
| *H04N 19/46* | (2014.01) |
| *H04N 19/164* | (2014.01) |

(52) U.S. Cl.
CPC ............ *H04N 19/12* (2014.11); *H04N 19/162* (2014.11); *H04N 19/164* (2014.11); *H04N 19/44* (2014.11); *H04N 19/46* (2014.11); *H04N 19/70* (2014.11)

(58) Field of Classification Search
CPC ....................................................... H04N 7/50
USPC ........ 375/240.01–240.29; 469/408, 409, 418, 469/419, 420, 699, 441, 445, 469
See application file for complete search history.

(56) References Cited

U.S. PATENT DOCUMENTS

| | | | |
|---|---|---|---|
| 6,624,761 B2* | 9/2003 | Fallon | 341/51 |
| 7,512,986 B2 | 3/2009 | Shen-Orr et al. | |
| 7,646,432 B2 | 1/2010 | Park et al. | |
| 2004/0028141 A1 | 2/2004 | Hsiun et al. | |
| 2004/0067043 A1 | 4/2004 | Duruoz et al. | |
| 2004/0221143 A1 | 11/2004 | Wise et al. | |
| 2006/0056506 A1* | 3/2006 | Ho et al. | 375/240.01 |
| 2006/0087457 A1 | 4/2006 | Rachwalski et al. | |
| 2006/0227815 A1 | 10/2006 | Khan | |
| 2006/0248235 A1* | 11/2006 | Eyer | 710/1 |
| 2007/0274340 A1* | 11/2007 | Raveendran et al. | 370/468 |
| 2007/0296613 A1 | 12/2007 | Hussain et al. | |
| 2008/0013562 A1 | 1/2008 | Fujinami et al. | |

(Continued)

OTHER PUBLICATIONS

Richardson, Iain, et al. "A framework for fully configurable video coding." Picture Coding Symposium, Dec. 2009. PCS 2009. IEEE, 2009. Retrieved from http://www4.rgu.ac.uk/files/47.pdf on Mar. 13, 2013; pp. 3-4.

(Continued)

*Primary Examiner* — Behrooz Senfi
(74) *Attorney, Agent, or Firm* — The Meola Firm, PLLC

(57) ABSTRACT

Systems and methods for encoding and decoding are disclosed. The systems and methods include multimedia decoder instantiation systems and multimedia processing engines which are capable of being upgraded or reconfigured to support a new or previously-unsupported compression format, without the need for platform-specific software or hardware upgrades.

18 Claims, 10 Drawing Sheets

(56) References Cited

U.S. PATENT DOCUMENTS

| | | | |
|---|---|---|---|
| 2008/0052540 | A1 | 2/2008 | Inokuchi et al. |
| 2008/0294691 | A1 | 11/2008 | Chang et al. |
| 2009/0016446 | A1 | 1/2009 | Yang et al. |
| 2009/0086104 | A1 | 4/2009 | Felder |
| 2009/0154556 | A1* | 6/2009 | Kim et al. ............... 375/240.02 |
| 2009/0304115 | A1 | 12/2009 | Pittaway et al. |
| 2009/0310671 | A1 | 12/2009 | Reynolds et al. |
| 2010/0027974 | A1 | 2/2010 | Ansari |
| 2010/0046627 | A1 | 2/2010 | Xiao et al. |
| 2010/0195820 | A1 | 8/2010 | Frank |

OTHER PUBLICATIONS

OneCodec. "OneCodec: Future proof your media." (online] Sep. 23, 2011 1-10, 13-15 Available at http://vimeo.com/29476212. Retrieved on Mar. 14, 2013.

Angus, Andrew. "Dropbox: Video Sharing and Photo Sharing Made Easy" [blog post] http://www.switchvideo.com/blog/2011/05/09/dropbox-video-sharing-and-photo-sharing-madeeasy/ May 9, 2011 Switch Video. Retrieved on Mar. 14, 2013.

Avaro, et al., "The MPEG-4 Systems and Description Language :A Way Ahead in Audio Visual Information Representation", Signal Processing: Image Communication, vol. 9, No. 4., May 1997.

Bystrom et al., "A Fully Re-Configurable Universal Video Decoder", DASIP 09.

Kannangara et al., "A Universal Video Decoder for Fully Configurable Video Decoding" *ICCE 2010*.

Philip et al., "Decoder Description Syntax for Fully Configurable Video Coding", ICIP, Nov. 2009.

Richardson et al., "Fully Configurable Video Coding Part 1", ISO/IEC JTCI/SC20/WG11 document M16751, Jun. 2009.

Richardson et al., "Fully Configurable Video Coding Part 2", ISO/IEC JTCUSC20/WG11 document M16752, Jun. 2009.

Richardson et al., "Implementing Fully Configurable Video Coding", ICIP, Nov. 2009.

Richardson et al., "A Framework for Fully Configurable Video Coding", PCS 2009.

International Preliminary Report on Patentability issued in International Patent Application No. PCT/US2011/52396 on Feb. 26, 2013.

International Preliminary Report on Patentability issued in International Patent Application No. PCT/US2011/52394 on Feb. 19, 2013.

International Search Report and the Written Opinion issued in International Patent Application No. PCT/US2013/23019 on Apr. 12, 2013.

International Preliminary Report on Patentability issued in International Patent Application No. PCT/US2011/52401 on Mar. 22, 2013.

* cited by examiner

SYSTEMS AND METHODS FOR ENCODING AND DECODING

CROSS REFERENCE TO RELATED APPLICATIONS

This application claims the benefit of the following U.S. Provisional Patent Applications: (1) U.S. App. No. 61/384686, filed on Sep. 20, 2010; (2) U.S. App. No. 61/387327, filed on Sep. 28, 2010; (3) U.S. App. No. 61/443658, filed on Feb. 16, 2011; and (4) 61/443660, filed on Feb. 16, 2011. Each of the above-referenced applications is hereby incorporated by reference in its entirety.

BACKGROUND

1. Field

The present technology relates to systems and methods of encoding and decoding audio, video and other multimedia data. More particularly, the technology relates to computer architecture and operating methods that can allow for reconfiguration of a multimedia decoder without interrupting multimedia playback.

2. Description of the Related Art

Digital multimedia capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital multimedia devices implement video encoding techniques, such as MPEG-2, MPEG-4, or H.264/MPEG-4, Part 10, Advanced Video Coding (AVC), in order to store, transmit, and receive digital video efficiently. Digital devices implement audio encoding techniques or formats such as AAC, MP3, and WAV to store, transmit, and receive digital audio efficiently. Digital devices further implement additional data and graphics encoding techniques or formats such as IGES, 3DT, PS, MNG ODF and SVG Encoding is predominantly proprietary or standards-based. Accordingly, multimedia is generally encoded in a fixed format. While current methods may provide some adaptation to changes in characteristics such as content, this adaptation is limited, e.g., in the case of video to the selection between a handful of modes in H.264/AVC. In existing protocols, there is no true content adaptation; once a standard is fixed, modification to the coding algorithms or data tables is not permitted. Further, devices that incorporate digital multimedia capabilities generally must conform to these standards. As a result, these devices have fixed decoders that are configured to decode only multimedia encoded in the fixed format(s). Selection between pre-determined formats, e.g. MPEG-2, MPEG-4, and H.263, has been suggested as in U.S. Pat. No. 7,085,320 and US Patent Application 2003/0182544. Similarly, utilization and selection between scalable coding layers within standards at the encoder was suggested in U.S. Pat. No. 6,553,072 and a corresponding decoder proposed. In these cases the utilized formats and their components are known at the encoder and the decoder. Hence there is still no true content adaptation, since the characteristics of the coding algorithms are fixed by the pre-determined coding formats.

In certain instances, it would be beneficial to utilize encoding or decoding algorithms generated based on the content to be encoded or parameters of the system, as doing so may more efficiently encode or decode multimedia data. However, decoders in devices for receiving such encoded multimedia data may not be configured to decode content encoded using such generated encoding methods. This lack of configuration may be due to reasons such as a limit on the number of decoders able to be implemented in a device, no support for legacy decoders, and no support for new encoders. Solutions to this problem have been explored by permitting either selection between sub-algorithms or codec components or reconfiguration of portions of the decoder. FIG. 1(a) illustrates selection between known decoder sub-algorithms or elements. Various selection strategies and targets have been suggested, such as variable-length decoder tables as in US Patent Application 2004/0028141 or code rates, interleaving techniques, and error control techniques as in U.S. Pat. No. 5,666, 170. Alternatively, FIG. 1(b) illustrates reconfiguration of decoder elements in hardware or software in response to control signals. Reconfiguration can be performed via methods such as dynamically interconnecting elements such as in US Patent Application 2003/0182544, US Patent Application 2011/0032985, and US Patent Application 2008/0130742. Further reconfiguration methods are to dynamically reconfigure portions of decoder processes or elements, such as adder arrays as in US Patent Application 2008/0130742 and caches as in US Patent Application 2007/0064006. In U.S. Pat. No. 7,385,532 a purely hardware decoder is reconfigured in response to bitstream commands.

Alternatively, software configuration or reconfiguration of portions of the decoder in response to configuration commands has been proposed. These have been predominantly toolbox-based. FIG. 2 shows a system from U.S. Pat. No. 5,987,181 which illustrates that a set of tools is known to both the encoder and decoder each of which can draw upon this set. The choice of tools used at the encoder is then transmitted to the decoder and the decoder reconfigures based upon the tools in the local toolbox. A similar solution was proposed in O. Avaro, P. A. Chou, A. Eleftheriadis, C. Herpel, C. Reader and J. Signès, "The MPEG-4 Systems and Description Language: A Way Ahead in Audio Visual Information Representation" and then more recently implemented in the MPEG Reconfigurable Video Coding (RVC) initiative as discussed in S. Lee, E. S. Jang, M. Mattavelli, C.-J. Tsai, "Working Draft 5 of ISO/IEC 23001-4: Codec Configuration Representation", ISO/IEC JTCI/SC20/WG11 document N9223 and E. S. Jang, J. Ohm, and M. Mattavelli, "Whitepaper on Reconfigurable Video Coding (RVC)", ISO/IEC JTCI/SC20/WG11 document N9586. The RVC decoder solution is illustrated in FIG. 3. Although only the decoder will be specified when then standard is developed, a set of toolboxes is available to both the encoder and decoder. The decoder constructs a model from the indicated tools, called functional units, by accessing the toolbox, and then instantiates a decoder by linking the selected functional units to the current decoder. This use of set toolboxes or tool libraries is further discussed in US Patent Application 2011/0032985 and well as in U.S. Pat. No. 7,385, 832.

Reconfiguring a single sub-algorithm without the use of a toolbox at the decoder was proposed in M. Bystrom, I. Richardson, S. Kannangara, and M. de-Frutos-Lopez, "Dynamic Replacement of Video Coding Elements" and in C. S. Kannangara, J. Philp, I. Richardson, M. Bystrom, and M. de-Frutos-Lopez, "A Syntax for Defining, Communicating, and Implementing Video Decoder Function and Structure". In these cases, the single element, a backwards transform, was encoded and transmitted to the decoder where it replaced the existing backwards transform either through the well-known binary patching method or code replacement and just-in-time compilation.

SUMMARY

The systems, methods, and devices described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, reconfiguration of a multimedia decoder without interrupting multimedia playback.

One aspect of the disclosure is a multimedia processing engine. The multimedia processing engine comprises an encoding decision component that determines an encoding functionality for encoding multimedia data based on at least one parameter. The engine also includes a decoding decision component that determines a decoding functionality corresponding to the encoding functionality and an encoder configured to encode the multimedia data using the determined encoding functionality. A processing unit configured to prepare the encoded multimedia data and the determined decoding functionality for communication to the decoder is also provided.

Another aspect of the disclosure is a multimedia processing engine which comprises a functionality interpreter. The functionality interpreter is configured to receive data corresponding to a functionality, generate the functionality based on the data, and instantiate a decoding algorithm using the functionality. The engine further includes a decoder configured to receive multimedia data, receive the decoding algorithm from the functionality interpreter, and decode multimedia data using the decoding algorithm.

A third aspect of the disclosure is a multimedia decoding instantiation system which comprises a functionality interpreter configured to receive configuration codewords and interpret the received codewords. The system further includes an instantiation module configured to instantiate a decoder in response to the received codewords. A decoding module is also provided, and it is configured to decode received multimedia data. The decoding is based on the interpreted codewords.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION OF CERTAIN INVENTIVE EMBODIMENTS

Figure 1A:
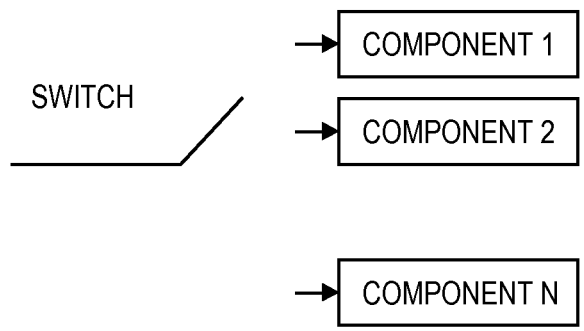
FIG. 1 is a block diagram showing conventional selection of pre-determined decoder components and reconfiguration of fixed decoder elements.
Figure 1B:
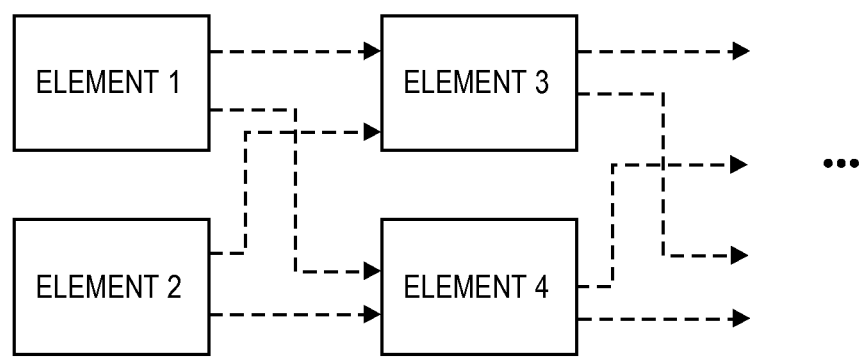
Figure 2:
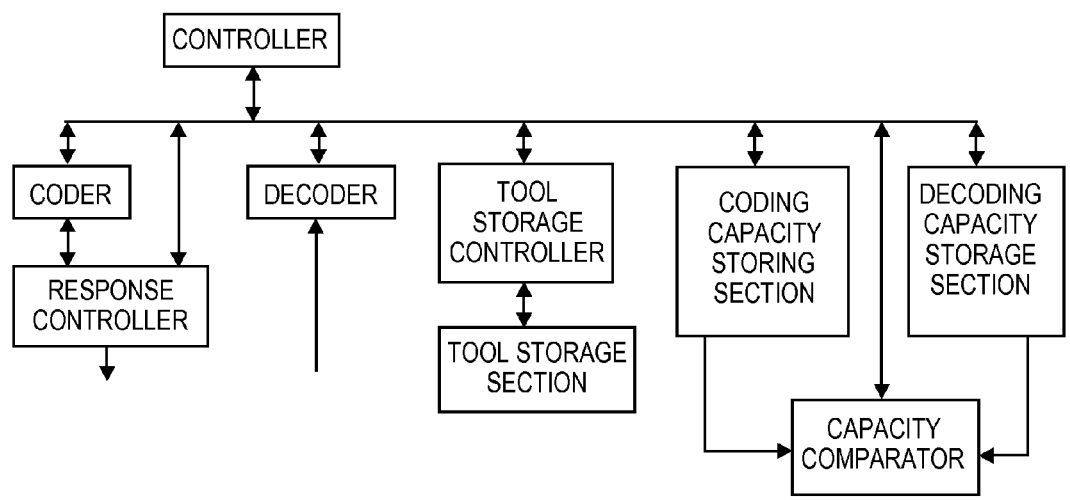
FIG. 2 is a block diagram showing a conventional reconfigurable video codec system.
Figure 3:
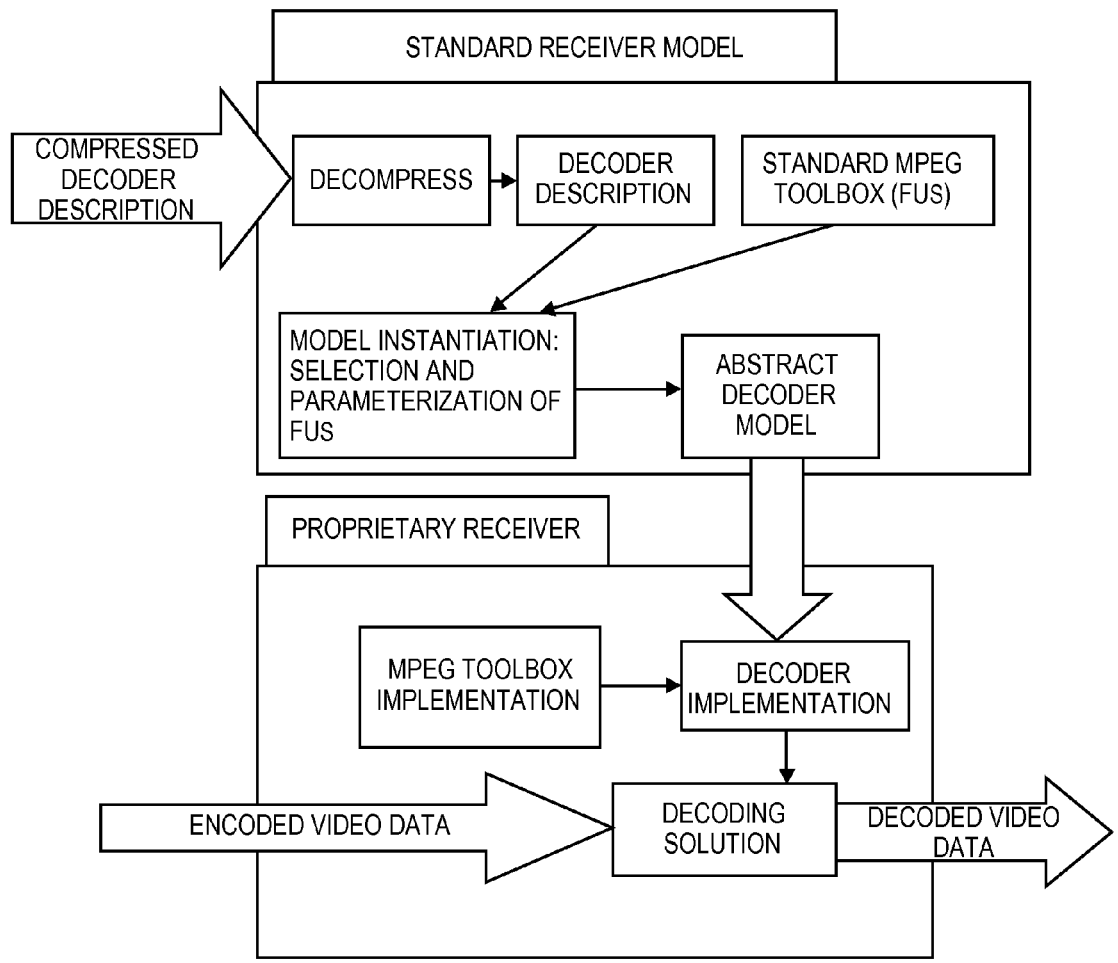
FIG. 3 is a block diagram illustrating an MPEG reconfigurable video decoder.

The following detailed description is directed to certain specific embodiments. However, the teachings herein can be applied in a multitude of different ways, including, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Various embodiments of systems and methods are described herein for encoding and decoding multimedia data and decoder reconfiguration functionality. In the embodiments described herein, the systems and methods may allow multimedia data to be encoded and decoded in a more efficient manner. For example, the systems and methods described herein may decrease the complexity required for the decoder to decode multimedia data. The systems and methods described herein may also increase the quality of compressed multimedia data. The systems and methods described herein may enable a multimedia encoder and/or decoder to be upgraded to support a new or previously-unsupported compression format, without the need for platform-specific software or hardware upgrades. Further, these systems and methods may increase the degree to which the multimedia data can be compressed. The systems and methods set forth herein also may allow for reconfiguration of a multimedia decoder at any time, even during multimedia playback, without interrupting the playback. Accordingly, multimedia coding may be optimized for individual coding units of arbitrary length (e.g., one or more segments of a frame of video data to one or more frames of video data) by allowing each coding unit to be encoded with a different encoding algorithm, while still allowing the decoder to decode the coding units in real time. In some embodiments, systems and methods may allow for any type of reconfiguration or modification of the multimedia decoder, without requiring replacement of the decoder hardware or download of new configuration data from an alternate data source other than the data provided by the encoder.

In one embodiment, the systems and methods described herein correspond to a reconfigurable decoder/receiver of multimedia data. The systems and methods described herein further correspond to an encoder/transmitter of multimedia data configured to transmit syntax elements (e.g., codewords) to the decoder that are used to reconfigure the decoder as further discussed below. It should be noted that certain embodiments described below may reference codewords, however, other syntax elements may be similarly used. For example, the syntax elements may allow the decoder to have updated functionality such as new decoding algorithms, new decoding routines, new code or data tables, new parameterizations or interconnections of software or hardware modules, new hardware circuit configurations, support for completely new compression formats, etc.

Figure 4:
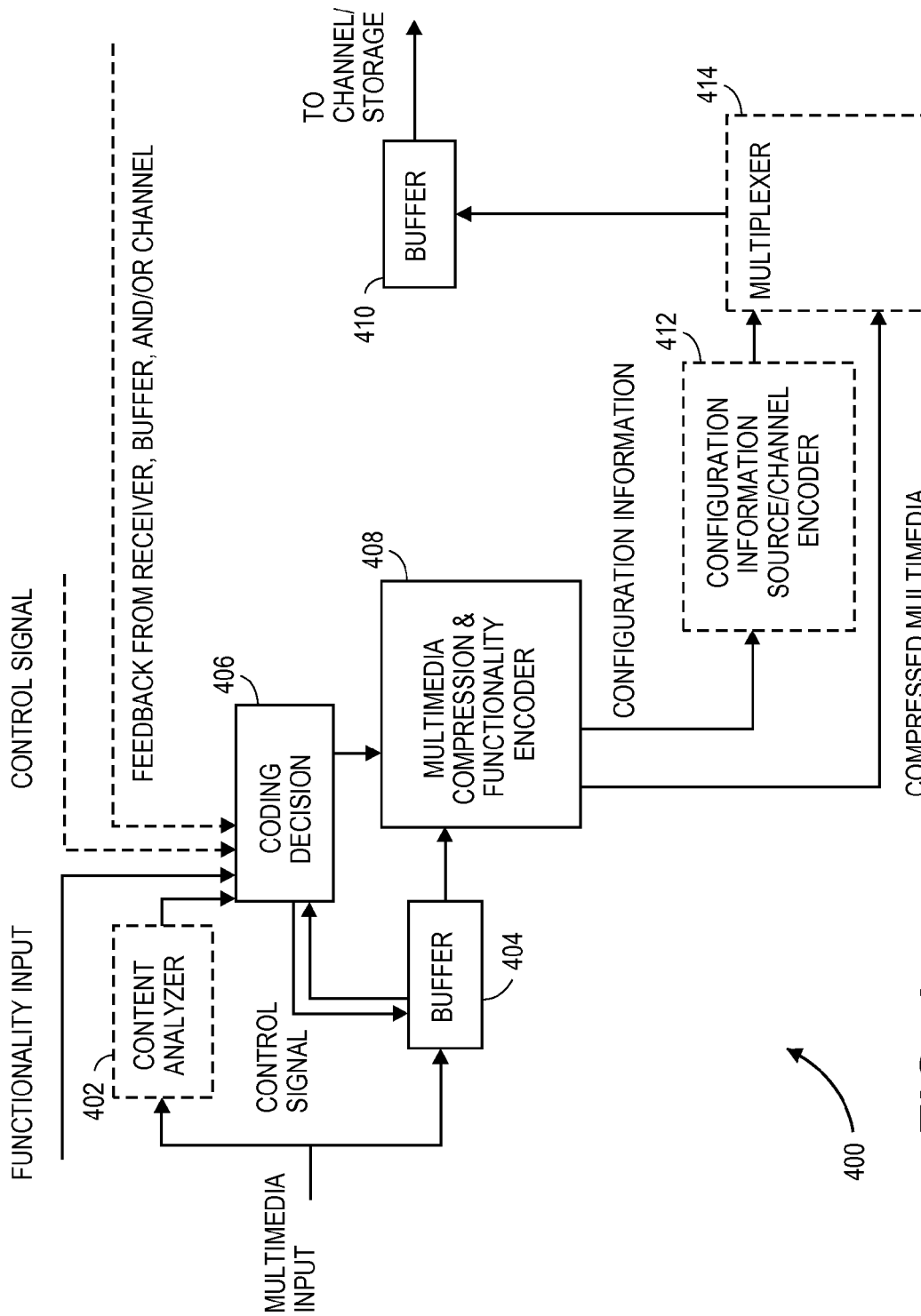
FIG. 4 is a block diagram illustrating a multimedia encoder that performs techniques as described in this disclosure.

FIG. 4 is a block diagram illustrating a multimedia encoder that performs techniques as described in this disclosure. The encoder 400 includes an optional content analyzer 402 and a first buffer 404 each configured to receive multimedia data. Each of the optional content analyzer 402 and the first buffer 404 are in communication with a coding decision component 406. The coding decision component 406 and the first buffer 404 are further in communication with a compression and functionality encoder 408. In one embodiment, the compression and functionality encoder 408 is directly in communication with a second buffer 410. Optionally, the multimedia compression and functionality encoder 408 is in communication with a configuration information source/channel encoder 412 and/or a multiplexer 414. The configuration information source/channel encoder 412 is also optionally in communication with the multiplexer 414. The functionality of the components of the encoder 400 is discussed in detail below.

The optional content analyzer 402 is configured to receive uncompressed multimedia data for analysis. The content analyzer 402 is configured to analyze the content of the multimedia data in order to detect features and/or attributes, which may be referred to as characteristics, in the multimedia data. For example, the content analyzer 402 detects activity in the multimedia data, changes in correlation between audio or video samples, a luminance range for video data, an audio range for audio data, frequency changes in audio data, color levels of the video data, motion changes in the video data, texture in the video data, scene changes of the video data, etc. A skilled artisan will appreciate that the content analyzer 402 may be configured to analyze more or fewer features and/or attributes in the multimedia data. The content analyzer 402 further provides information about the detected features to the encoding decision component 406. It should be noted that in some embodiments, the encoder 400 does not include the content analyzer 402.

The coding decision component 406 is configured to receive the information about detected features of the multimedia data from the content analyzer 402. The coding decision component 406 is further configured to receive functionality input from a local library (e.g., a memory store), a non-local library of functions (e.g., an external device comprising a memory store), from an algorithmic configuration generator, and/or from a user. The libraries may be updated with new functionalities at any time. The functions may correspond to encoding, decoding, and/or pre-/post-processing algorithms, entropy code tables, transforms, variable length code selection changes, compression techniques, reconstruction techniques, and/or other suitable data that can be used to encode and decode the multimedia data. The coding decision component 406 is further configured to receive the multimedia data from the optional content analyzer 402 or the buffer 404.

Utilizing any available information about the detected features of the multimedia data, the functionality input, and/or additional input(s), collectively which may be referred to as parameters, the coding decision component 406 determines how to encode and decode the multimedia data. Examples of parameters may include: a power source of the decoder, a processing power of the decoder, a memory availability of the decoder, an available configuration time period of the decoder, a channel for transmitting the functionality, etc. In one embodiment, the coding decision component 406 may select certain functions from the functionality input for coding portions of the multimedia data. Decisions on encoding and decoding the multimedia data may be made on the basis of a coding unit of the multimedia data. The size of the coding unit may be variable or fixed. The coding unit for video may be, for example, as small as a pixel of video data, a block of video data within a frame of video data, an entire frame of video data, several frames of video data, etc. The coding unit for audio may be, for example, a single sample, a plurality of samples of audio, a single channel of audio, a plurality of channels of audio, a subframe of audio, a frame of audio, etc. Certain functionality of the coding decision component 406 is described in further detail below with respect to FIG. 5.

The coding decision component 406 sends the determined functionality for encoding and decoding the coding unit(s) to the multimedia compression and functionality encoder 408.

The multimedia compression and functionality encoder 408 receives the coding unit from the coding decision component 406 or the first buffer 404 and compresses the coding unit based on the encoding functionality received from the coding decision component 406. Further, the multimedia compression and functionality encoder 408 encodes the decoding functionality received from the coding decision component 406. For example, the functionality is mapped to one or more syntax elements such as bytecodes or codewords with optional overhead information. The codeword may correspond to an encoded version of the functionality data that is decodable by a decoder. The overhead information may correspond to information used by the decoder to identify and/or decode the syntax element(s) such as a synchronization code and/or a header that identifies the length of the data segment containing codewords. The syntax element(s) and optional overhead information are sent to either the optional configuration information source/channel encoder 412, to the optional multiplexer 414, or directly to the second buffer 410. The compressed multimedia data corresponding to the coding unit are sent either to the optional multiplexer 414 or directly to the second buffer 410. The functionality of the multimedia compression and functionality encoder 408 is described in further detail below with respect to FIG. 6.

The configuration information source/channel encoder 412 may be configured to receive the syntax elements and optional overhead information from the multimedia compression and functionality encoder 408. It may be further configured to source code the syntax element(s) and overhead information. Various source coding configurations such as entropy encoding may be used as would be understood by one of ordinary skill in the art. Alternatively or additionally, the configuration information source/channel encoder 412 may be configured to perform channel encoding. It may be configured to channel encode the syntax elements and optional overhead information or the source encoded syntax elements and optional overhead information. Various channel encoding configurations may be used as would be understood by one of ordinary skill in the art. The configuration information entropy encoder 412 may then transmit the encoded data to either the multiplexer 414 or directly to the second buffer 410.

In the embodiment shown in FIG. 4, the multiplexer 414 is configured to receive the compressed multimedia data corresponding to the coding unit from the multimedia compression and functionality encoder 408. The multiplexer is further configured to receive the one or more syntax elements and optional overhead information directly from the multimedia compression and functionality encoder 408, or source/channel encoded syntax element(s) and optional overhead information from the configuration information source/channel encoder 412. The multiplexer 414 is configured to multiplex the syntax element(s) and optional overhead information (source/channel encoded or not) with the compressed multimedia data to form a bitstream corresponding to both pieces of data. The multiplexer 414 is configured to send the multiplexed data to the second buffer 410.

The second buffer 410 is configured to receive the syntax elements and optional overhead information (encoded or not), as well as the compressed multimedia data. The second buffer 410 may receive the syntax elements and optional overhead information as a first bitstream and the compressed multimedia data as a second bitstream. For example, if the encoder 400 does not include the optional multiplexer 414, the second buffer 410 receives the compressed multimedia data directly from the multimedia compression and functionality encoder 408 and receives the syntax elements and optional overhead information from either the multimedia compression and functionality encoder 408 or the configuration information source/channel encoder 412 as discussed above. Alternatively, the second buffer 410 receives the syntax elements and optional overhead information multiplexed with the compressed multimedia data as a single bitstream.

The second buffer 410 may output the bitstream(s) to a storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media (e.g., DVD, Blu-Ray, CD, etc.), and the like. The storage medium may be accessible by the receiver/decoder. Additionally or alternatively, the second buffer 410 outputs the bitstream(s) for wired or wireless transmission to the receiver/decoder. For example, the second buffer 410 outputs the bitstream(s) to an appropriate transceiver and/or modem for transmitting the bitstream(s) to the receiver/decoder over one or more communication channels. Any known wired and/or wireless protocol may be used such as, IEEE 802.11 standards, including IEEE 802.11(a), (b), or (g), the BLUETOOTH standard, CDMA, GSM, TDMA, Ethernet (IEEE 802.3), and/or USB. The receiver/decoder may utilize the bitstream(s) to reconfigure a decoder to decode the compressed multimedia data as discussed in further detail below with respect to FIG. 7.

Figure 5:
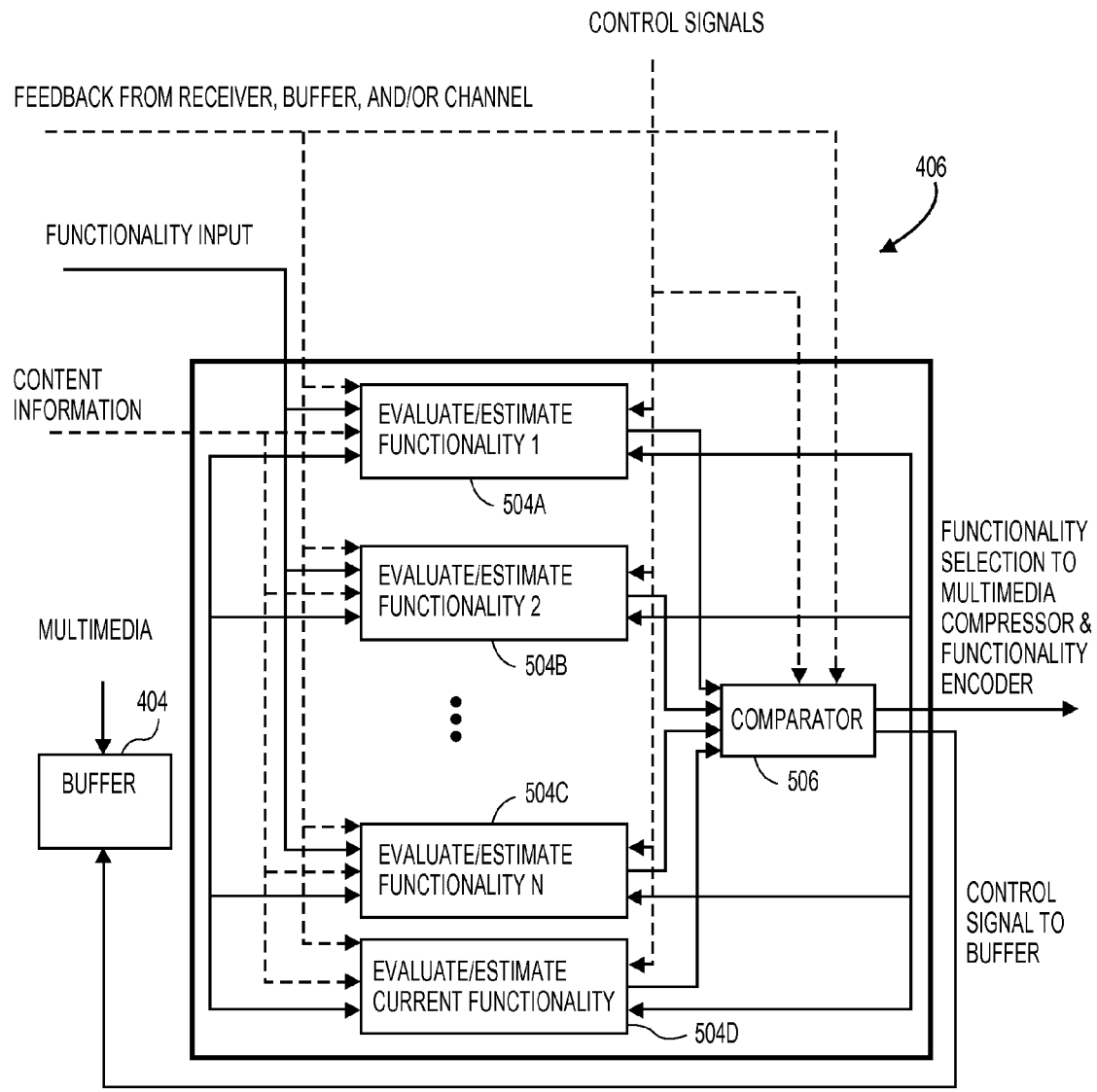
FIG. 5 is a more detailed block diagram illustrating the coding decision component of FIG. 4.

FIG. 5 is a block diagram illustrating the coding decision component 406 of FIG. 4. The coding decision component 406 comprises an encoding decision component and a decoding decision component. Further, the decoding decision component may determine a different functionality to decode the multimedia data than the functionality determined for the encoder. The functionality chosen for decoding may be based on the encoding functionality and complementary to the encoding functionality such that multimedia data encoded with the encoding functionality may be decoded with the decoding functionality. The coding decision component 406 includes one or more functionality evaluators/estimators 504a-504d in communication with the first buffer 404. Although only four functionality evaluators/estimators are shown in this figure, the coding decision component 406 may comprise any number of functionality evaluators/estimators 1 through N, where N is a positive integer. The functionality evaluators/estimators 504a-504d are further in communication with a comparator 506, which may further be in communication with the first buffer 404. The functionality of the components of the coding decision component 406 is discussed in detail below.

Each of the functionality evaluators/estimators 504a-504d is configured to receive functionality input from a local library (e.g., a memory store), a non-local library of functions, from an algorithmic configuration generator, and/or from a user. The libraries may be updated with new functionalities at any time. The functionality evaluators/estimators 504a-504d may each receive one or more functionalities from the functionality input. For example, each functionality evaluator/estimator 504a-504d may receive a different functionality from the functionality input. It should be noted that each functionality evaluator/estimator 504a-504d may not receive a functionality for evaluation for each coding unit. Further, in one example, one of the functionality evaluators/estimators (e.g., functionality evaluator/estimator 504d) may be used to store the functionality used for compressing and/or decompressing a previous coding unit. The functionality evaluators/estimators 504a-504d may then evaluate the functionality for coding the coding unit based on objective and/or subjective criteria (e.g., rate of the compressed data, distortion of the reconstructed data, complexity, etc.) and create a value result for each criterion. Additionally or alternatively, the functionality evaluators/estimators 504a-504d may create a measure as a result that is a weighted value based on each of the value results for each criterion. The measure may be, for example, a cost function such as $J=R+\lambda_1 D+\lambda_2 C_E+\lambda_3 C_D$ where R is the rate or estimated rate of the compressed data plus the configuration information and overhead, D is the distortion or estimated distortion of the reconstructed data, measured by any convenient measure, $C_E$ is the complexity allowance of the encoder measured by a convenient measure, and $C_D$ is the complexity allowance of the receiver(s) measured by a convenient measure. Different weights may be given to the criteria (e.g., R, D, $C_E$, and $C_D$) as would be understood by one of ordinary skill in the art. The measure J may be the overall cost of the functionality evaluated, where a higher cost corresponds to a lower rating of the functionality. It should be noted that other criteria/characteristics may be used as well.

In one embodiment, each functionality evaluator/estimator 504a-504d may be configured to evaluate one or more coding units for one or more characteristics for a given functionality by encoding or encoding and decoding the coding unit(s) using the functionality and evaluating each criterion of the encoded coding unit. This embodiment may be referred to as an "evaluating mode." In another embodiment, each functionality evaluator/estimator 504a-504d may be configured to evaluate one or more coding units for one or more criteria for a given functionality by estimating the value of each criterion of the coding unit if the coding unit were to be encoded and/or decoded using the functionality. This embodiment may be referred to as an "estimating mode." The estimate may be based on content analysis of the coding unit and/or prior coding unit(s) such as from the content analyzer 102. In yet another embodiment, some functionality evaluator/estimator 504a-504d may encode or encode and decode the coding units, while others may estimate the criteria value(s) without encoding the coding units.

For each of the embodiments of the functionality evaluator/estimator 504a-504d described above, the functionality evaluator/estimator 504a-504d may be configured to operate in only one of the estimating mode or the evaluating mode. Alternatively, the functionality evaluator/estimator 504a-504d may be configured to operate in either one of the estimating mode or the evaluating mode based on a control signal received from an automated controller or a user of the encoder 400. The control signal may also indicate to the functionality evaluator/estimator 504a-504d, for which criteria to evaluate the functionality for the coding unit and/or the weights to assign the criteria. Additionally or alternatively, the control signal may indicate to the comparator 506 for which criteria to evaluate the functionality for the coding unit and/or the weights to assign the criteria.

Further, for each of the embodiments of the functionality evaluator/estimator 504a-504d described above, the functionality evaluator/estimator 504a-504d may be configured to receive feedback information. The feedback information may include, for example, buffer levels of the encoder and/or decoder, channel quality of any communication channels on which the data are sent from the transmitter to the receiver, allocated channel bandwidth of such communication channels, a receiver type (e.g., battery-operated, not battery operated, mobile, non-mobile, etc.), and/or receiver resource status (receiver buffer capacity, battery level, processor utilization, etc.). The functionality evaluator/estimator 504a-504d may further utilize the feedback information to evaluate the functionalities for the coding unit. For example, the feedback information may be used to adjust the weights assigned to one or more criteria for creating a measure of the functionality. In another example, feedback information about the channel, such as indication of a poor channel, may implicitly or explicitly increase the relative weight of R, the rate of the compressed data, as the available bandwidth of the channel may be limited requiring a lower rate of the compressed data. In another example, the feedback information may be about the constraints of the receiver. For example, the receiver may be a mobile device with limited memory and/or limited processing power. Accordingly, the criteria may be weighted to create a functionality that requires less memory to build a decoder and/or less processing power to decode the encoded coding unit. One of ordinary skill in the art will recognize other similar adjustments that can be made based on the feedback information. Additionally or alternatively, the feedback information may be sent to the comparator 506.

Each functionality evaluator/estimator 504a-504d may send the values of the criteria for the functionality and/or the overall measure of the functionality to the comparator 506. The comparator 506 may further optionally receive the control signals and/or the feedback information as discussed above. The control signals and the feedback information may adjust the relative weights assigned by the comparator 506 to the criteria as discussed above with respect to the function of each functionality evaluator/estimator 504a-504d. The comparator 506 selects the functionality to use for encoding/compressing the coding unit and the functionality for decoding/decompressing the coding unit by comparing the values of the criteria for each functionality and/or the overall measure of each functionality. In one embodiment, where the comparator 506 receives a measure, the comparator 506 selects the functionality based on the measure cost (e.g., the functionality with the lowest measure cost). In another embodiment, where the comparator 506 receives the values of criteria, the comparator selects the functionality based on relative weights of the criteria. In yet another embodiment, the comparator 506 only selects the functionality based on particular criteria that may be a subset of all of the criteria evaluated. Further, the comparator 506 may operate according to any of the embodiments described herein and/or still additional embodiments, wherein the functionality of the comparator 506 selects between the described embodiments by using the control signal.

The comparator 506 further sends the selected encoding and decoding functionality for the coding unit to the multimedia compression and functionality encoder 408 as discussed above with respect to FIG. 4. The comparator 506, in some embodiments, further sends a control signal to the first buffer 404 to transfer the coding unit for which the functionality is selected to the multimedia compression and functionality encoder 408 as discussed above with respect to FIG. 4. In an embodiment where functionality evaluator/estimator 504d is used to store the functionality used for compressing a previous coding unit, the comparator 506 may be configured to send the selected functionality to the functionality evaluator/estimator 504d for storage and use for a subsequent coding unit.

Figure 6:
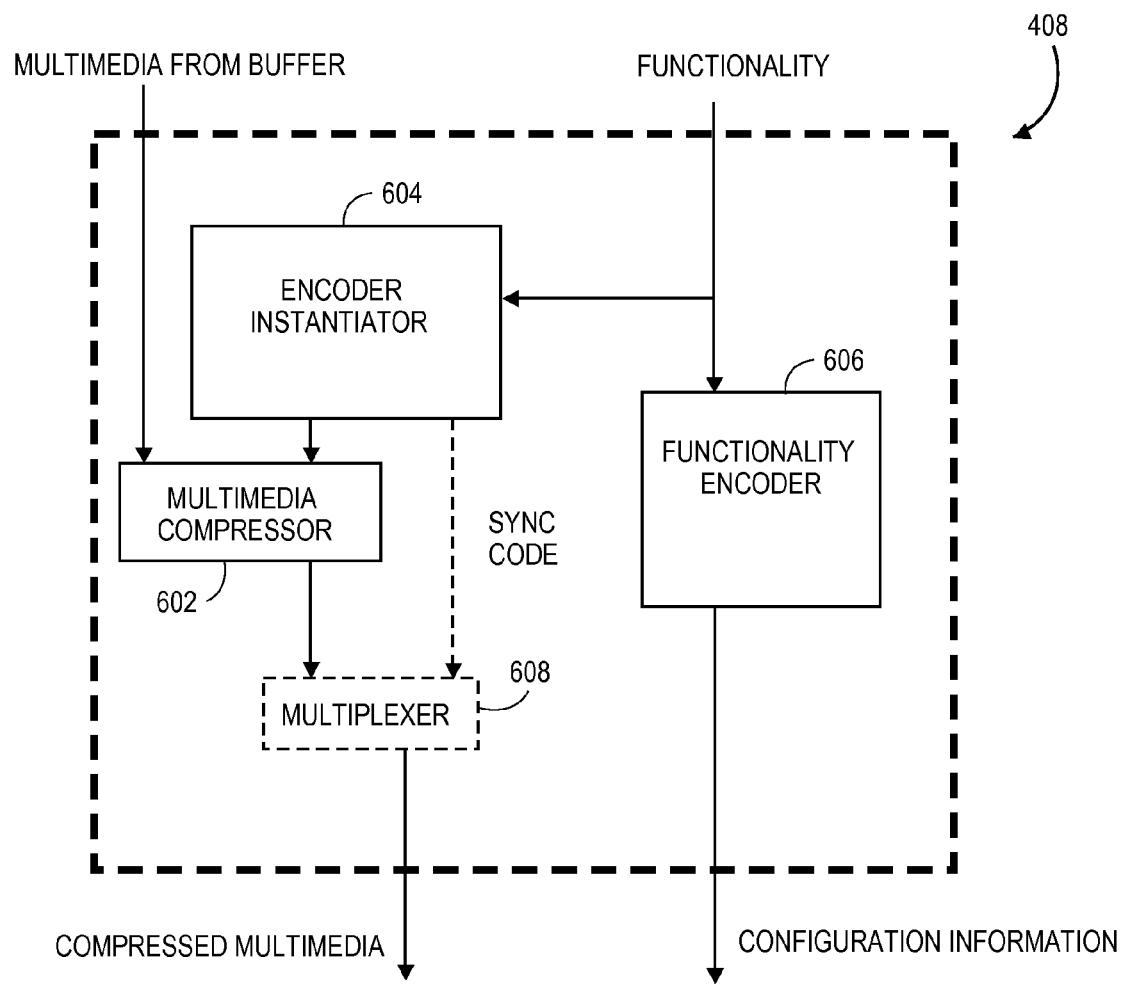
FIG. 6 is a more detailed block diagram illustrating the multimedia compression and functionality encoder of FIG. 4.

FIG. 6 is a block diagram illustrating the multimedia compression and functionality encoder 408 of FIG. 4. The multimedia compression and functionality encoder 408 includes a multimedia compressor 602 in communication with the buffer 404. The multimedia compressor 602 is further in communication with an encoder instantiator 604, which is in communication with the coding decision component 406. The coding decision component 406 is further in communication with the functionality encoder 606. Each of the encoder instantiator 604 and the multimedia compressor 602 may by in communication with an optional multiplexer 608. The functionality of the components of the multimedia compression and functionality encoder 408 is discussed in detail below.

The encoder instantiator 604 receives the selected encoding functionality from the coding decision component 406. The encoder instantiator 604 uses this information and data to augment, delete, or replace the current functionality running on the multimedia compressor 602. The encoder instantiator 604 inserts the selected functionality into the multimedia compressor 602. Optionally, the encoder instantiator 604 produces a synchronization (sync) code that indicates to the receiver with which coding unit the selected functionality is associated and sends the sync code to optional multiplexer 608. In some embodiments, a new functionality may be selected at predetermined intervals (e.g., every N frames where N is a positive integer) and therefore a sync code is not needed since the receiver can expect an updated functionality at regular intervals. In some embodiments, for example when the optional multiplexer 414 is utilized, the codewords generated by the functionality encoder may be distinct from the compressed multimedia and therefore a sync code is not needed.

The multimedia compressor 602 receives the coding unit from the buffer 404 and compresses the coding unit using the functionality inserted into the multimedia compressor 602 by the encoder instantiator 604. The multimedia compressor 602 then sends the compressed coding unit to the optional multiplexer 414 or the second buffer 410 as discussed above with respect to FIG. 4. Alternatively, the multimedia compressor 602 sends the compressed coding unit to the optional multiplexer 608. The optional multiplexer 608 multiplexes the sync code with the compressed coding unit and then outputs the multiplexed data to the optional multiplexer 414 or the second buffer 410 as discussed above with respect to FIG. 4.

The functionality encoder 606 is typically configured to receive the selected decoding functionality from the coding decision component 406 and to further encode the functionality received from the coding decision component 406. In some embodiments, the functionality is mapped to one or more syntax elements with optional overhead information. The syntax element may correspond to an encoded version of the functionality data that is decodable by a functionality interpreter. The overhead information may correspond to information used by the decoder to identify and/or decode the syntax elements such as a header that identifies the data as syntax elements. Additionally or alternatively, the overhead information may correspond to information that indicates what operation is being performed with the functionality, e.g., add a new functionality, replace an existing functionality, delete an existing functionality, alter the parameters of existing and/or new functionalities, and/or alter interconnections of existing and/or new functionalities. The syntax elements and optional overhead information are sent to either the optional configuration information source/channel encoder 412, to the optional multiplexer 414, or directly to the second buffer 410.

Figure 7:
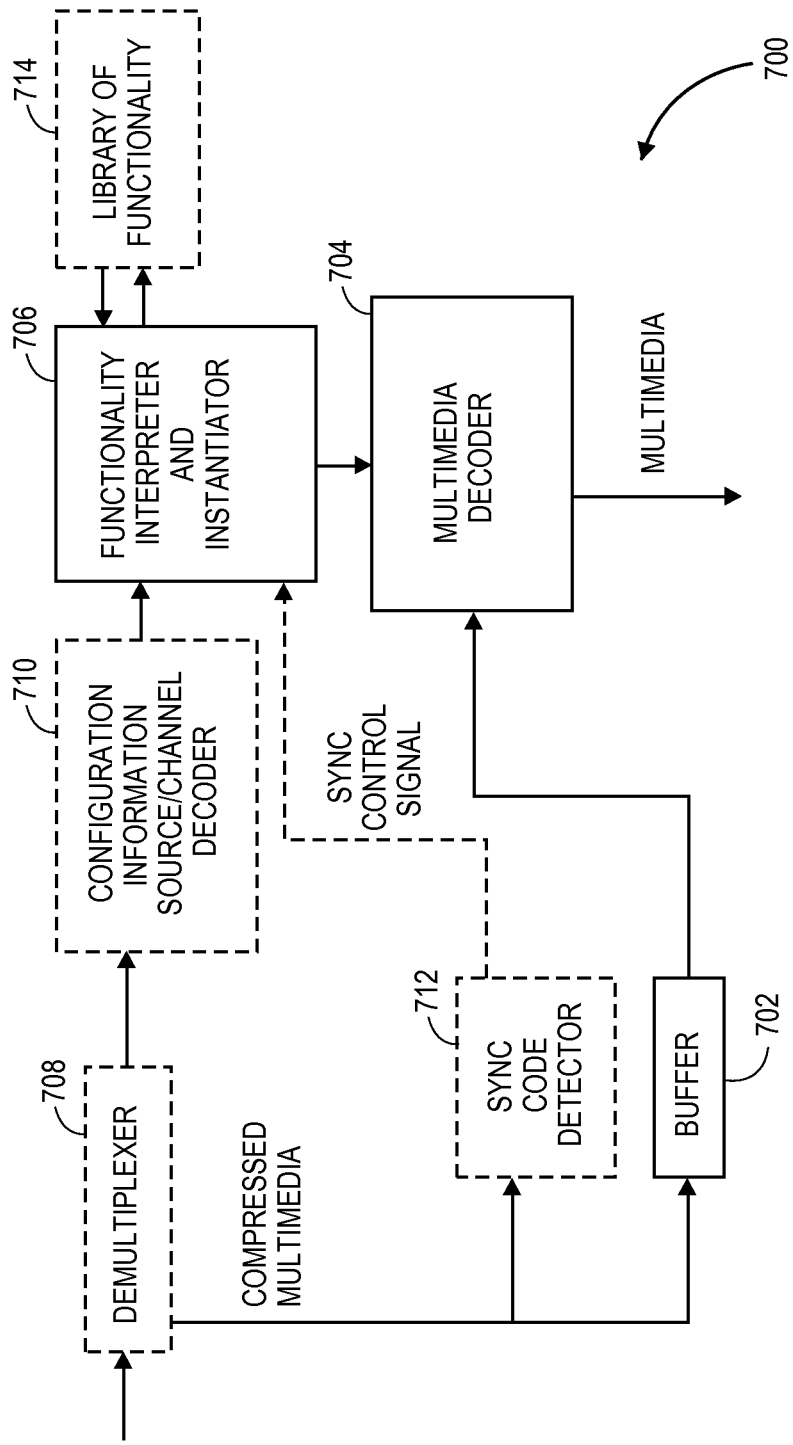
FIG. 7 is a block diagram illustrating a decoder that performs techniques as described in this disclosure.

FIG. 7 is a block diagram illustrating a reconfigurable decoder in accordance with one or more inventive aspects. The reconfigurable decoder 700 includes a buffer 702 in communication with a multimedia decoder 704. The multimedia decoder 704 is further in communication with a functionality interpreter and instantiator 706. The reconfigurable decoder 700 optionally includes a demultiplexer 708 in communication with the buffer 702 and the functionality interpreter and instantiator 706 (directly or via a configuration information source/channel decoder 710). The reconfigurable decoder 700 further optionally includes the configuration information source/channel decoder 710 in communication with the functionality interpreter and instantiator 706. The configuration information source/channel decoder 710 is further in communication with the optional demultiplexer 708, if included in the decoder 700. The demultiplexer 708 is further in communication with an optional sync code detector 712, which is further in communication with the functionality interpreter and instantiator 706. In addition, the functionality interpreter and instantiator 706 may be in communication with an optional library of functionality 714. The functionality of components of the reconfigurable decoder 700 is described in further detail below.

The presence or absence of optional components in the reconfigurable decoder 700 may be based on the configuration of components of a corresponding encoder (e.g., encoder 400) that sends encoded multimedia data to the decoder 700 for decoding, although this is not a requirement. For example, if multimedia data are sent from an encoder to the decoder 700 is multiplexed as discussed above with respect to FIG. 4, the decoder may include the demultiplexer 708 to demultiplex the multiplexed data. In addition, if the configuration information data received from the encoder are source and/or channel encoded as discussed above with respect to FIG. 4, the decoder 700 may include the source/channel decoder 710 to decode the configuration information data.

The buffer 702 is configured to receive compressed multimedia data from an encoder such as discussed above with respect to FIG. 4. The buffer 702 may receive the compressed multimedia data as a bitstream directly from the encoder. Alternatively, the encoder may send a bitstream with the compressed multimedia data multiplexed with syntax elements and optional overhead information corresponding to a functionality. Accordingly, the demultiplexer 708 receives the bitstream and demultiplexes the data into a compressed multimedia data bitstream with the compressed multimedia data and a functionality data bitstream with configuration information in the form of the syntax elements and optional overhead information. The demultiplexer 708 then sends the compressed multimedia data bitstream to the buffer 702 and optionally to the sync code detector 712. The demultiplexer 708 further sends the functionality data bitstream to the optional configuration information source/channel decoder 710 and/or the functionality interpreter and instantiator 706.

The configuration information source/channel decoder 710 is configured to source and/or channel decode the functionality data bitstream when the data are source and/or channel encoded by the encoder. The configuration information entropy decoder 710 is configured to send the decoded functionality data bitstream to the functionality interpreter and instantiator 706.

The sync code detector 712 is configured to determine whether the compressed multimedia data bitstream includes a multiplexed sync code that identifies the functionality associated with the coding unit in the compressed multimedia data bitstream. The sync code detector 712 is further configured to send a control signal to the functionality interpreter and instantiator 706 that identifies the functionality data bitstream that is associated with the coding unit.

The functionality interpreter and instantiator 706 receives the functionality data bitstream, which includes syntax elements and optional overhead information, as discussed above. The functionality interpreter and instantiator 706 maps the syntax elements to the correct functionality. For example, the syntax elements may map to processing elements, structures, and/or code segments. Based on these syntax elements, the functionality interpreter and instantiator 706 instantiates a decoder. For example, the functionality interpreter and instantiator 706 interconnects, parameterizes, deletes or replaces existing functionality used by the multimedia decoder 704. Additionally or alternatively, the functionality interpreter and instantiator 706 generates machine code or hardware organization and links the code or organization with the multimedia decoder 704, thus reconfiguring the multimedia decoder 704 based on the received functionality. In another example, the functionality interpreter and instantiator 706 may cause the multimedia decoder 704 to reconfigure a data path used for decoding multimedia data, such as by reconfiguring an electronic circuit. In another embodiment, the functionality interpreter and instantiator 706 may generate machine code segments based on the syntax element(s) for decoding the multimedia data. In yet another embodiment, the functionality interpreter and instantiator 706 comprises a compiler configured to generate compiled code segments based on the syntax element(s). The functionality interpreter and instantiator 706 may further link the compiled code segments to instantiate a decoder. In another embodiment, the functionality interpreter and instantiator 706 parameterizes software code segments based on the codewords. In yet another embodiment, the functionality interpreter and instantiator 706 stores data, such as data tables, to memory based on the codewords. The functionality interpreter and instantiator 706 may further utilize the sync control signal from the sync code detector 712 to configure the multimedia decoder 704 with the correct functionality at the same time the multimedia decoder 704 receives the coding unit associated with the functionality.

Additionally, the reconfigurable decoder 700 may include a library of functionality 714 in communication with the functionality interpreter and instantiator 706. The functionality interpreter and instantiator 706 may store received functionalities in the library of functionality 714 and later access the functionalities via corresponding syntax elements as necessary to reconfigure the multimedia decoder 704 as opposed to regenerating machine code and/or hardware organization. This may reduce the computational requirements for switching to a previously-used functionality, but increases the memory needed to store previous functionalities. The library of functionality 714 may comprise internal or external memory.

The multimedia decoder 704 is configured by the functionality interpreter and instantiator 706 as discussed above. The multimedia decoder 704 further receives coding units from the buffer 702 to be decompressed according to the received functionality. The multimedia decoder 704 decompresses the compressed coding unit and outputs the decoded multimedia data. The multimedia decoder 704 may comprise a field programmable gate array (FPGA) or other suitable configurable circuitry.

Figure 8:
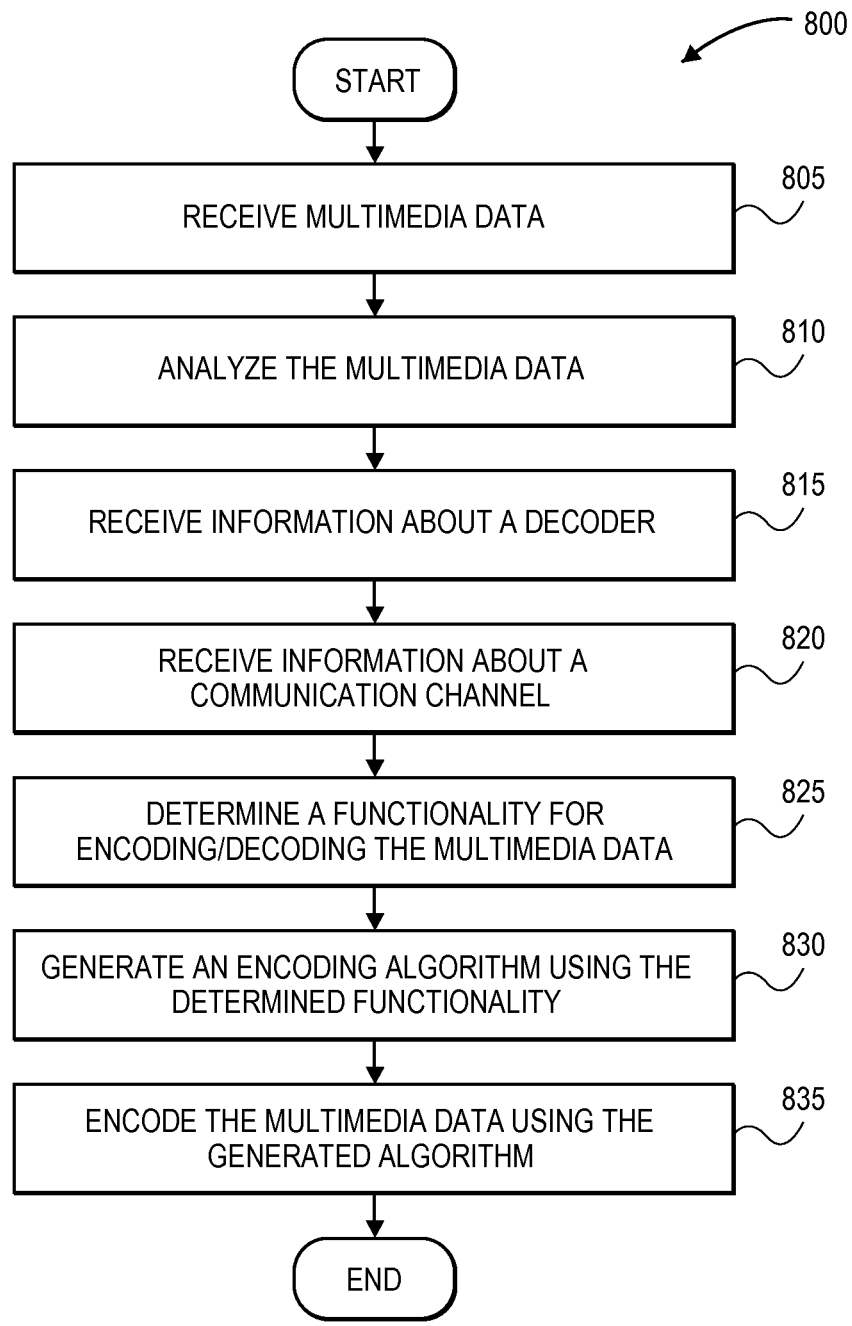
FIG. 8 is a flowchart illustrating an exemplary process for determining a format for coding multimedia data.

FIG. 8 is a flowchart illustrating an exemplary process 800 for determining a format for encoding multimedia data. First, at a step 805, an encoder receives multimedia data. Continuing at an optional step 810, the encoder analyzes the content of the multimedia data for various characteristics. Further at an optional step 815, the encoder further receives information about a decoder. The information may include information regarding memory constraints, processor, mobility, power constraints, etc. of the decoder. Next, at an optional step 820, the encoder further receives information about a communication channel over which functionality information and/or compressed multimedia is to be sent to the decoder. The information may include bandwidth limitations, load, etc. Continuing at a step 825, the encoder determines optimal or near-optimal functionality for encoding/decoding the multimedia data based on the characteristics, information about the decoder, and/or information about the communication channel(s). Next, at a step 830, the encoder uses the determined functionality to generate an encoding algorithm. Further, at a step 835 the encoder encodes the multimedia data using the generated algorithm.

Figure 9:
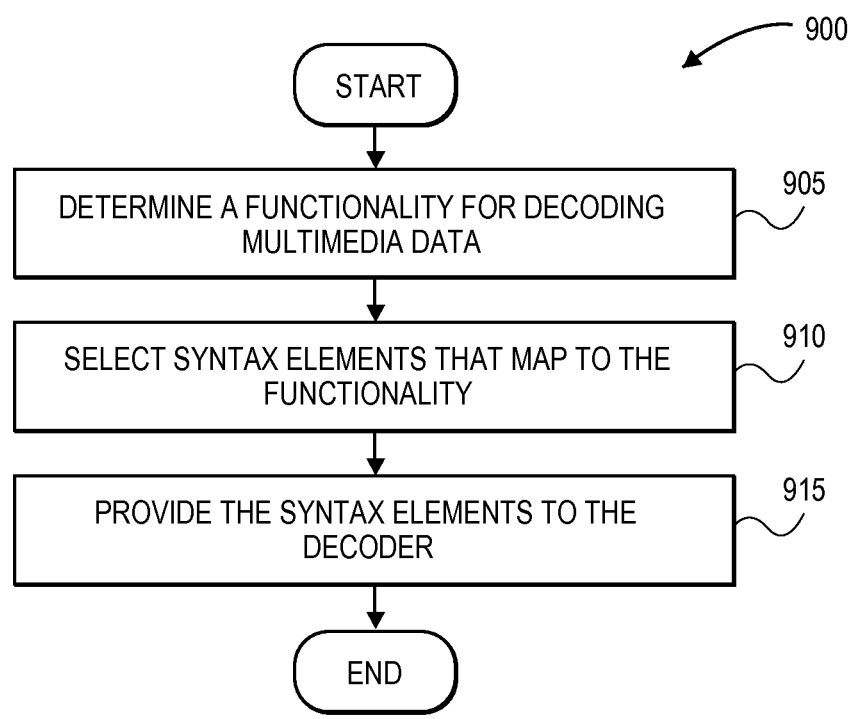
FIG. 9 is a flowchart illustrating an exemplary process for generating functionality for a decoder.

FIG. 9 is a flowchart illustrating an exemplary process 900 for generating functionality for a decoder. Starting at a step 905, the encoder determines which functionality to select for decoding multimedia data such as according to process 800. Continuing at a step 910, the encoder selects syntax elements such as codewords that map to the selected functionality. Further at a step 915, the encoder may provide the syntax elements to the decoder.

Figure 10:
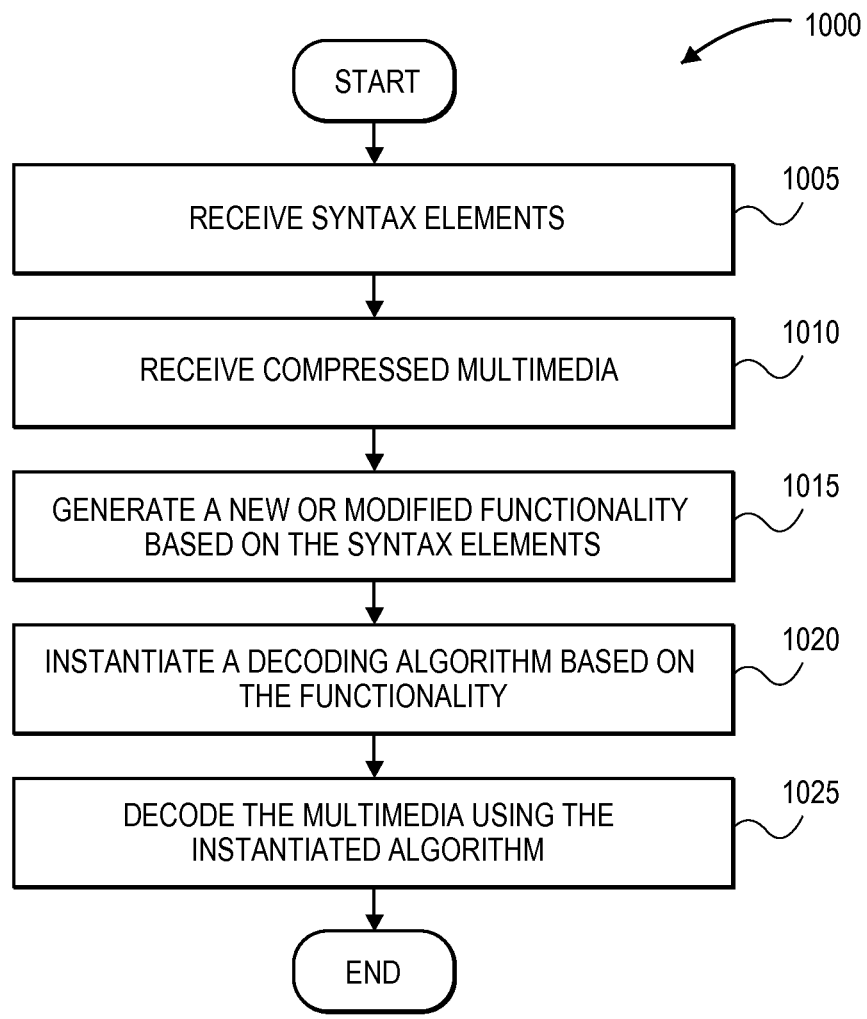
FIG. 10 is a flowchart illustrating an exemplary process for generating a decoder.

FIG. 10 is a flowchart illustrating an exemplary process 1000 for generating a decoder. At a step 1005, the decoder receives syntax elements such as codewords. Continuing at a step 1010, the decoder additionally receives compressed multimedia data. Further at a step 1015, the decoder generates a new or modified functionality for decoding the compressed multimedia data based on the received syntax elements. Further, at a step 1020, the decoder uses the functionality to instantiate decoding elements in the decoder by techniques such as reconfiguring data paths in the decoder. Next at a step 1025, the decoder decodes the multimedia data using the instantiated decoding algorithm.

One or ordinary skill in the art should recognize that various steps may be added or omitted from the processes 800, 900, and 1000. Further, the various steps of the processes 800, 900, and 1000 may be performed in a different order than described above. Further, the ordering of the steps should not be construed as requiring that each of the steps occur in a linear manner. Accordingly, one or more steps of the processes 800, 900, and 1000 may be performed at the same time.

The technology is operational with numerous other general purpose or special purpose computing system environments or configurations. Examples of well known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), a Wide Area Network (WAN), a personal area network (PAN), and/or a home network may be a corporate computing network, including access to the Internet, to which computers and computing devices comprising the system are connected. In one embodiment, the LAN conforms to the Transmission Control Protocol/Internet Protocol (TCP/IP) industry standard.

As used herein, multimedia refers to images, graphics, sounds, animations, interactive elements, models, video or any other multimedia type data that is entered into the system.

As used herein, decode refers to decompression, interpretation, playback and/or conversion.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and run under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A multimedia processing engine comprising:
a coding decision component comprising:
a plurality of functionality evaluator/estimators each receiving one or more functionalities from a functionality input, evaluating the received functionalities for multimedia data based on objective and/or subjective criteria, and creating a value result for each criterion;
a comparator which determines an encoding functionality for encoding multimedia data by comparing the value results of the criteria for each functionality and/or the overall measure of each functionality; and which determines a decoding functionality corresponding to the encoding functionality by comparing the value results of the criteria for each functionality and/or the overall measure of each functionality;

said multimedia processing engine further comprising:
- an encoder that encodes the multimedia data using the determined encoding functionality; and
- a processing unit that prepares the encoded multimedia data and the determined decoding functionality for communication to a decoder, wherein said decoding functionality includes syntax elements for reconfiguring the decoder.

2. The multimedia processing engine of claim 1, further comprising a content analyzer configured to analyze the multimedia data for one or more characteristics of the multimedia data, and wherein the at least one parameter comprises at least one of the one or more characteristics.

3. The multimedia processing engine of claim 1, wherein the parameter is based on a channel for transmitting the functionality.

4. The multimedia processing engine of claim 1, wherein the parameter is at least one of: a power source of the decoder, a processing power of the decoder, a memory availability of the decoder, and an available configuration time period.

5. The multimedia processing engine of claim 1, wherein the parameter is a user input.

6. The multimedia processing engine of claim 1, wherein the processing unit includes a multiplexer.

7. The multimedia processing engine of claim 1, wherein the processing unit includes a source encoder.

8. The multimedia processing engine of claim 1, wherein the processing unit includes a channel encoder.

9. The multimedia processing engine of claim 1, wherein the functionality evaluator/estimators create a measure as a result that is a weighted value based on each of the value results for each criterion.

10. The multimedia processing engine of claim 9 wherein the measure is a cost function.

11. The multimedia processing engine of claim 10 wherein the cost function includes one or more of: the rate or estimated rate of compressed data plus configuration information and overhead; a complexity allowance of the encoder; and a complexity allowance of one or more receivers.

12. The multimedia processing engine of claim 1, wherein one of the functionality evaluator/estimators is used to store the functionality used for at least one of compressing or decompressing a previous coding unit of multimedia data.

13. The multimedia processing engine of claim 1, wherein one or more of the functionality evaluator/estimators is configured to evaluate one or more coding units of multimedia data for one or more characteristics for a given functionality by encoding or decoding the coding unit(s) using the functionality and evaluating each criterion of the encoded coding unit.

14. The multimedia processing engine of claim 1, wherein one or more of the functionality evaluator/estimators is configured to evaluate one or more coding units of multimedia data for one or more criteria for a given functionality by estimating the value of each criterion of the coding unit if the coding unit were to be one of at least encoded or decoded using the functionality.

15. The multimedia processing engine of claim 1, wherein one or more of the functionality evaluator/estimators is configured to receive feedback information which is utilized to evaluate the functionalities for a coding unit of the multimedia data.

16. The multimedia processing engine of claim 15, wherein the feedback information includes one or more of the following data: buffer levels of the encoder and a decoder, channel quality of any communication channels on which the data are sent from a transmitter to a receiver, allocated channel bandwidth of such communication channels, a receiver type and receiver resource status.

17. The multimedia processing engine of claim 16, wherein the receiver type is at least one of the following: battery-operated, not battery operated, mobile, and non-mobile.

18. The multimedia processing engine of claim 17, wherein the receiver resource status includes at least one of a receiver buffer capacity, a battery level and a processor utilization).

* * * * *